(12) United States Patent
Jakubec et al.

(10) Patent No.: US 10,189,389 B2
(45) Date of Patent: Jan. 29, 2019

(54) SYSTEM WITH A PIVOTABLE ARMREST AND A LOCKING AID

(71) Applicant: Johnson Controls Technology Company, Plymouth, MI (US)

(72) Inventors: Ivan Jakubec, Trnava (SK); Miroslav Rezbarik, Trencin (SK); Michal Martinka, Nove Mesto nad Vahom (SK)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 307 days.

(21) Appl. No.: 15/037,912

(22) PCT Filed: Nov. 21, 2014

(86) PCT No.: PCT/EP2014/075325
§ 371 (c)(1),
(2) Date: May 19, 2016

(87) PCT Pub. No.: WO2015/078793
PCT Pub. Date: Jun. 4, 2015

(65) Prior Publication Data
US 2016/0272093 A1 Sep. 22, 2016

(30) Foreign Application Priority Data

Nov. 27, 2013 (DE) .......................... 10 2013 019 717
Mar. 31, 2014 (DE) .......................... 10 2014 206 030

(51) Int. Cl.
*B60N 2/75* (2018.01)

(52) U.S. Cl.
CPC .................................... *B60N 2/757* (2018.02)

(58) Field of Classification Search
CPC ............................... B60N 2/757; A47C 7/543
(Continued)

(56) References Cited

U.S. PATENT DOCUMENTS 4,848,840 A 7/1989 Toya
5,352,012 A * 10/1994 Chowdhury ........... B60N 2/757
297/113
(Continued)

FOREIGN PATENT DOCUMENTS

CN 101 722 899 A 6/2010
DE 199 41 737 C1 5/2001
(Continued)

OTHER PUBLICATIONS

Chinese Office Action dated May 2, 2017.

*Primary Examiner* — Milton Nelson, Jr.
(74) *Attorney, Agent, or Firm* — McGlew and Tuttle, P.C.

(57) ABSTRACT

A system with a pivotable armrest (1) and a locking aid (18), wherein the armrest (1) is coupled to a holding device (10) so as to be pivotable about a primary axis (11) and is reversibly transferable between a use position and a stowage position via a transition position. The armrest (1) is connected to a connecting element (15) for rotation therewith. The locking aid (18) is arranged on the connecting element (15). The locking aid (18) is in frictional contact with the holding device (10) at a contact point or along a contact surface. The locking aid (18) is configured in such a manner that the frictional contact between holding device (10) and locking aid (18) is greater in a transition position than in the use position and/or in the stowage position.

13 Claims, 3 Drawing Sheets

(58) Field of Classification Search
USPC .................................. 297/411.38, 411.32
See application file for complete search history.

(56) References Cited

U.S. PATENT DOCUMENTS

| | | | |
|---|---|---|---|
| 6,375,265 B1* | 4/2002 | Hubner | B60N 2/767 |
| | | | 297/411.32 |
| 2003/0020315 A1 | 1/2003 | Laval | |
| 2012/0104822 A1* | 5/2012 | Henke | B60N 2/757 |
| | | | 297/411.32 |
| 2012/0126071 A1 | 5/2012 | Mayer | |

FOREIGN PATENT DOCUMENTS

| | | |
|---|---|---|
| DE | 101 94 785 B3 | 11/2004 |
| DE | 10 2010 051699 A1 | 5/2012 |
| EP | 1 080 985 A2 | 3/2001 |

* cited by examiner

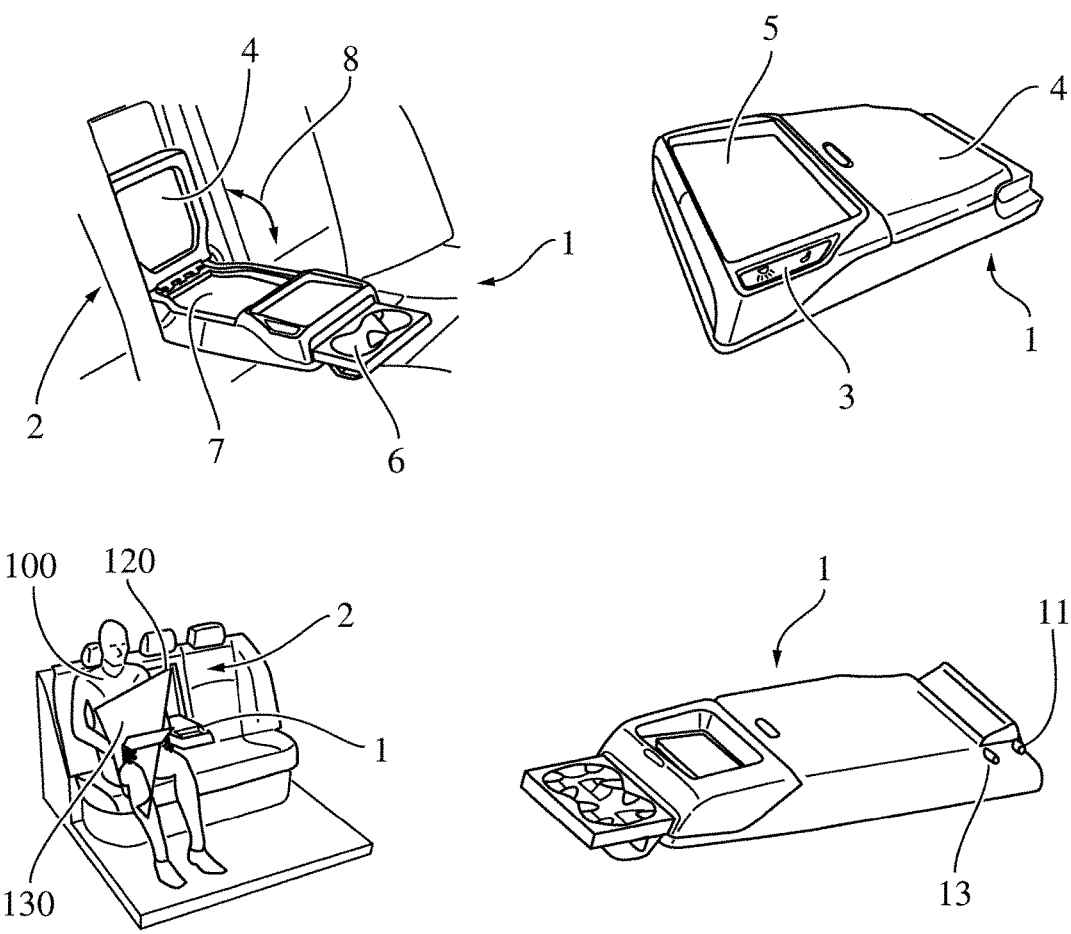
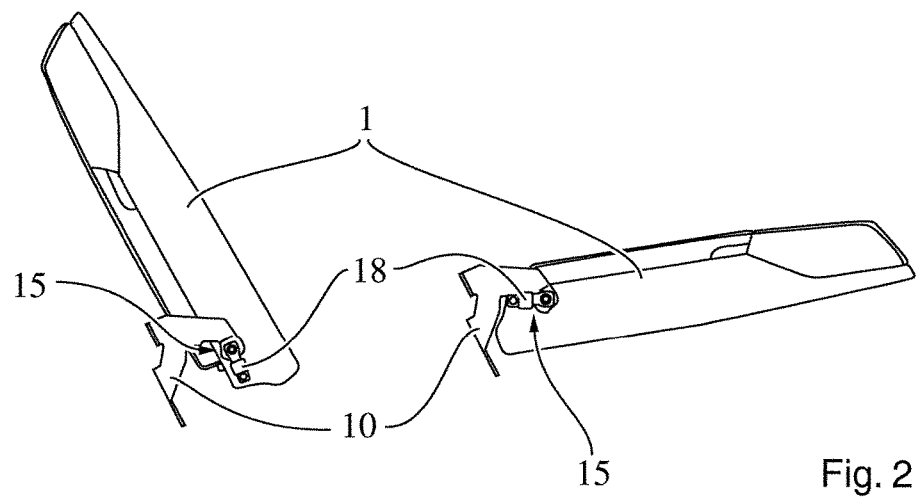
Fig. 1
Fig. 2

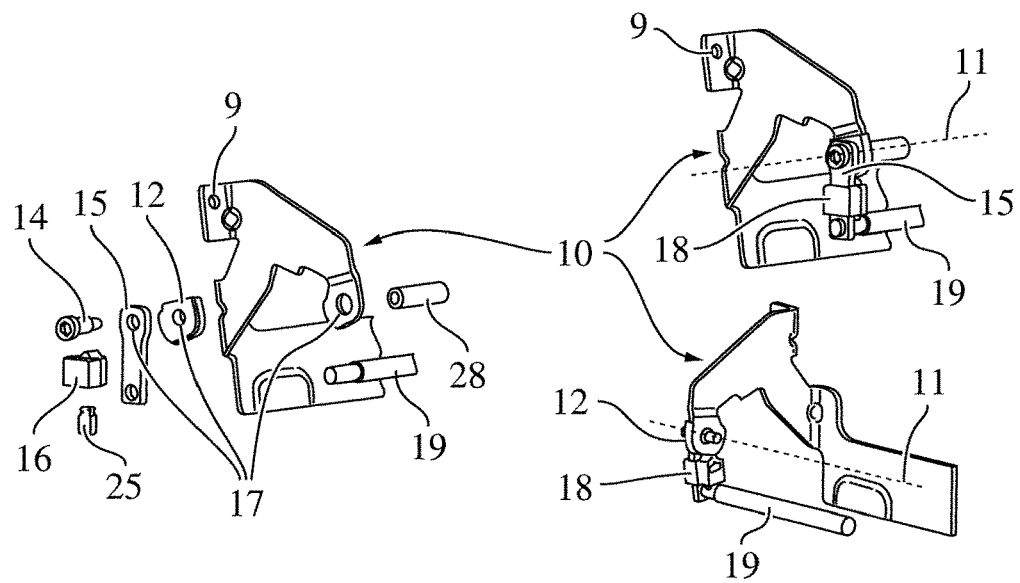
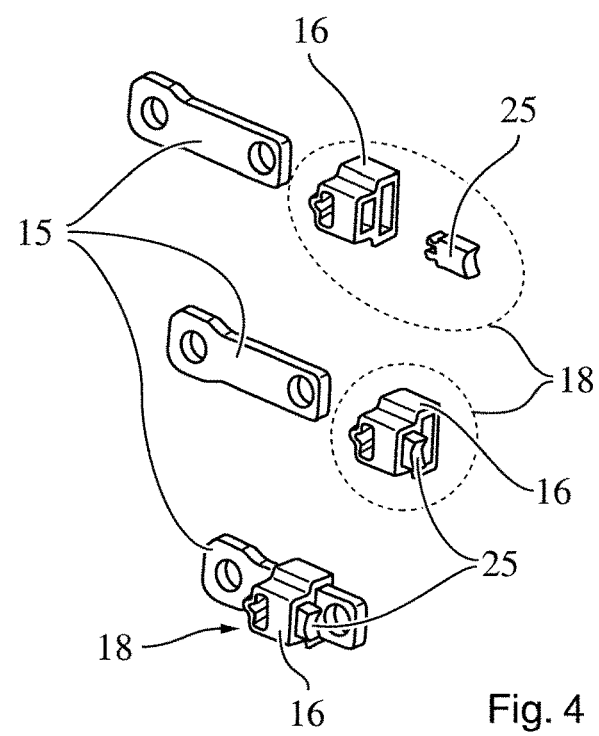

SYSTEM WITH A PIVOTABLE ARMREST AND A LOCKING AID

CROSS REFERENCE TO RELATED APPLICATIONS

This application is a United States National Phase Application of International Application PCT/EP2014/075325 filed Nov. 21, 2014 and claims the benefit of priority under 35 U.S.C. § 119 of German Applications 10 2013 019 717.1, filed Nov. 27, 2013 and 10 2014 206 030.3 filed Mar. 31, 2014, the entire contents of which are incorporated herein by reference.

FIELD OF THE INVENTION

The present invention relates to pivotable armrests. Pivotable armrests are known from the prior art and can commonly be found on vehicle seats, preferably on the backrests thereof. In particular, pivotable armrests can, when not presently being used, be transferred into a space-saving stowage position. Typically, the backrest comprises a recess into which the pivotable armrest can be pushed for stowage purposes. In the usage position, the armrest may not only serve as a support for an arm but may also further increase comfort for the passenger by way of additional stowage area or easily accessible operating elements.

BACKGROUND OF THE INVENTION

It has proven to be a disadvantage of pivotable armrests that, during the transfer movement, it is often not clear to the passenger whether the pivotable armrest has already assumed the stowage position or a usage position or whether it is still in a transition position.

SUMMARY OF THE INVENTION

An object of the present invention is to provide a system which assists the passenger, during the transfer movement of the armrest, in identifying whether a stowage position or a usage position has already been assumed. Furthermore, the system should support the fixing of the pivotable armrest in the usage position or in the stowage position.

The object of the present invention is achieved by way of a system having a pivotable armrest and having a locking aid, wherein the armrest is articulated on a bracket means so as to be pivotable about a primary axis and can be transferred reversibly between a usage position and a stowage position via a transition position, wherein the armrest is connected rotationally conjointly to a connecting element, wherein a locking aid is arranged on the connecting element, which locking aid is in frictionally engaging contact with the bracket means, wherein the locking aid is configured such that the frictionally engaging contact between bracket means and locking aid in a transition position is greater than that
  in the usage position and/or
  in the stowage position.

Owing to the increased frictional engagement action in the transition position, it is the case, during the transfer of the armrest, that a resistance which opposes the pivoting movement of the armrest is realized in the transition position, which resistance is greater than that in the usage position and/or in the stowage position. On the basis of a change in resistance during the transfer of the armrest from the transition position into the usage position or into the stowage position, the passenger can then advantageously be made aware of the attainment of the usage position or of the stowage position. Here, it is conceivable for the locking aid or the bracket means to be configured such that, during the pivoting of the armrest from the usage position into the stowage position (or vice versa), the resistance changes, in particular changes in continuous fashion. Provision is also made for the armrest to be arranged substantially vertically when in the stowage position and to be arranged substantially horizontally when in the usage position. In particular, provision is made for the armrest
  to be transferred from the stowage position into the usage position by way of a pivoting movement about the primary axis along a first direction of rotation, and
  to be transferred from the usage position into the stowage position by way of a pivoting movement about the primary axis along a second direction of rotation, wherein the first direction of rotation is opposite to the second direction of rotation.

In a further embodiment, provision is made for the locking aid to comprise a displaceable part, wherein the displaceable part is displaceable relative to the connecting element along an offset direction. In particular, provision is made for the offset direction to be predefined by the general profile of the connecting element. Here, provision is furthermore made whereby the displaceable part is displaced along the offset direction as soon as the armrest departs from the stowage position or from the usage position. In other words: the displaceable part is positioned differently relative to the connecting element in the transition position than in the usage position or stowage position.

In a further embodiment, provision is made for the locking aid to have a spring element with a restoring force, wherein the spring element is arranged between the connecting element and the bracket means. In particular, the restoring force acts along a direction running parallel to the offset direction. It is preferably the case that the spring element is operatively connected to the adjustable part and ensures positioning of the adjustable part along the connecting element.

In a further embodiment, provision is made for the displaceable part of the locking aid to have a hollow body, wherein the hollow body at least partially encases the connecting element and the spring element. In particular, provision is made for the displaceable part to be shaped such that the displaceable part is guided substantially by the connecting element along the offset direction. In this way, it is advantageously possible for a force exerted by the locking aid to be channeled onto the bracket means, without the risk of the locking aid with tensioned spring element breaking away laterally, that is to say along a direction running perpendicular to the offset direction.

In a further embodiment, provision is made for the displaceable part of the locking aid to have a projection, wherein the projection is configured such that the projection is in frictionally engaging contact with the bracket means. By way of the projection, the contact area can be minimized, whereby a fast transition between a high level of frictional engagement in the transition position and a relatively low level of frictional engagement in the usage position or in the stowage position can be realized. In particular, it is conceivable for the bracket means to be configured such that the projection
  is guided over a ramp in order to depart from the stowage position by way of a pivoting movement along the first direction of rotation, and/or
  is guided over a ramp in order to depart from the usage position by way of a pivoting movement along the second direction of rotation. Here, it is conceivable for the ramp to be configured in each case such that increased expenditure of force is required for the pivoting of the armrest out of the stowage position or out of the usage position.

In a further embodiment, provision is made for the locking aid to be configured such that the spring element presses the displaceable part of the locking aid against the bracket means. In particular, the spring element presses the adjustable part against the bracket means more intensely in the transition position than in the usage position and/or in the stowage position. Furthermore, it is conceivable for elastic characteristics of the spring element to be adaptable to the requirements of the system with pivotable armrest and locking aid.

In a further embodiment, provision is made for the bracket element to be configured such that the spacing between
  a first end of the spring element and
  the contact point or the contact surface
is smaller in the transition position than in the usage position or stowage position. By way of the shaping or embodiment of the bracket means, the change in frictionally engaging contact can be realized. In particular, provision is made for the adjustable part to be guided along a contour of the bracket means during the transfer from the stowage position into the usage position. Here, it is conceivable that, for the further increase of the frictional engagement in the transition position, the contour of the bracket means is roughened along a region, wherein the roughened region is contacted by the adjustable part during the transfer of the armrest from the usage position into the stowage position or vice versa.

In a further embodiment, provision is made for the bracket means to have a guide cap, wherein the guide cap defines the spacing between
  the first end of the spring element and
  the contact point or the contact surface
for the usage position, the transition position and the consumption position. In particular, the guide cap is composed of a different material than the bracket means, and/or the guide cap is welded or clipped to the bracket means.

A further subject of the present invention is a backrest which has a system having a pivotable armrest and having a locking aid, as has been described above.

A further subject of the present invention is a vehicle seat which has a system having a pivotable armrest and having a locking aid, as has been described above.

Further details, features and advantages of the invention will emerge from the drawings and from the following description of preferred embodiments on the basis of the drawings. Here, the drawings illustrate merely exemplary embodiments of the invention, which do not restrict the essential concept of the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 shows examples of pivotable armrests in four images;

FIG. 2 shows a system having a pivotable armrest and having a locking aid as per a first exemplary embodiment, in a stowage position and in a usage position;

FIG. 3 shows a bracket means for a system having a pivotable armrest and having a locking aid as per the first exemplary embodiment of the present invention, in an exploded illustration and in perspective views;

FIG. 4 shows the locking aid for the system having the pivotable armrest and having the locking aid as per the first exemplary embodiment of the present invention;

DESCRIPTION OF THE PREFERRED EMBODIMENTS

Figure 5:
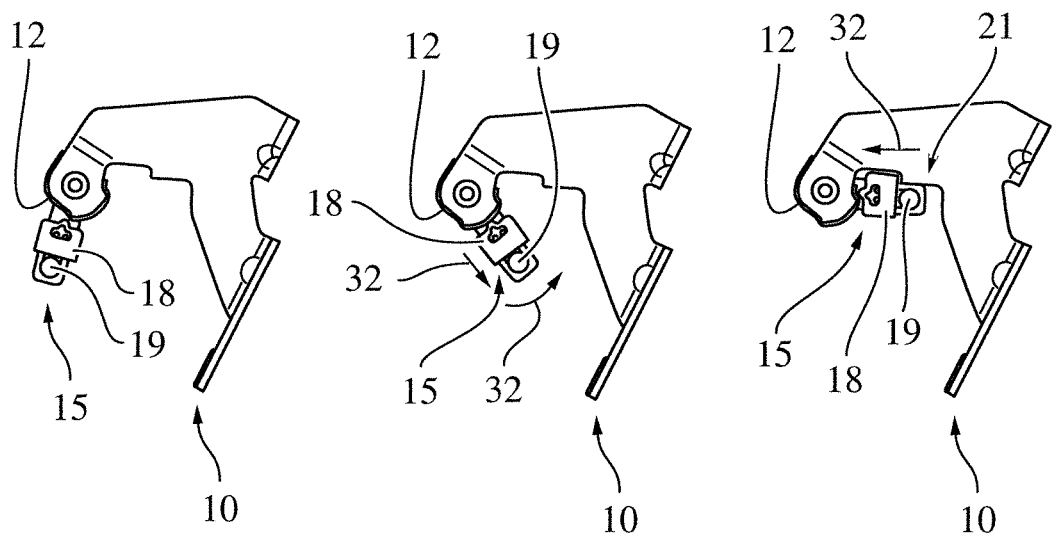
FIG. 5 shows, in detail and in a side view, the bracket means for the system having the pivotable armrest and having the locking aid as per the first exemplary embodiment of the present invention, wherein the armrest is, from left to right, situated in the stowage position, in a transition position and in the usage position.

In the various figures, identical parts are always denoted by the same reference designations, and will therefore generally also be named or mentioned in each case only once.

FIG. 1 illustrates, in four images, examples of pivotable armrests 1 that relate to the present invention. Armrests 1 of said type are preferably integrated into a backrest 2 of a vehicle seat, in particular into the backrest 2 of a rear bench of a vehicle. Here, the armrest 1 can be reversibly transferred between a stowage position and a usage position. In the stowage position, a passenger 100 of the vehicle can support his or her arm on the armrest. In particular, the armrest is encased with a cushioning such that the passenger 100 can, in the stowage position, lean his or her back against a first cushioned side of the armrest 1 and can, in the usage position, support his or her arm on a second cushioned side of the armrest 1. It is furthermore conceivable for the armrest 1 to have a stowage compartment 7 which, in the usage position, is accessible via a flap 4 incorporated into the armrest 1. In particular, it is conceivable for the flap 4 to be articulated on the armrest 1 so as to be pivotable about a flap axis 13 by way of a tilting movement 8. It is furthermore conceivable for the armrest 1 to at least partially provide for the passenger 100 a utility surface 5, in particular in the front third of the armrest 1, on which utility surface the passenger 100 can temporarily store or place articles when the armrest 1 is in the usage position. It is furthermore conceivable for the pivotable armrest 1 to have actuation elements 3, such as for example pushbuttons, rotary buttons or other switches, in particular integrated into a control panel or switch panel, wherein the actuation of the actuation element 3 effects a change in the vehicle interior compartment, preferably at the vehicle seat. For example, the temperature or the illumination in the vehicle interior compartment can be changed by way of the actuation means. It is furthermore conceivable for the pivotable armrest 1 to comprise a beverage holder 6, wherein the beverage holder 6 can, in the usage position, be pulled out of the armrest 1. Provision is furthermore made for the backrest 2 of the vehicle seat to have a backrest recess into which the armrest 1 can be pushed in order to assume the stowage position. The backrest recess preferably has an illuminated wall which provides ambient light for the vehicle interior compartment. In particular, the backrest recess has a wall on which light sources 120 can be arranged, wherein a light cone 130 emitted by the light source 120 is directed toward the field of view of the passenger 100, and thereby serves for example as a reading aid for the passenger 100. In particular, it is conceivable for the light source 120 to be pivotable, and thus for the light cone 130 to be individually adjustable.

FIG. 2 illustrates an armrest 1 as per an exemplary first embodiment of the present invention, wherein the armrest 1 is, on the left-hand side, situated in the stowage position and, on the right-hand side, situated in the usage position. Here, provision is made for the armrest 1 to be pivoted through substantially 90° during the transition from the stowage position into the usage position. It is preferable for the armrest 1, in particular a general profile of the armrest 1, to be arranged substantially vertically in the stowage position and substantially horizontally in the usage position. For the pivoting movement, the armrest 1 is articulated on a bracket means 10, wherein the bracket means 10 is in turn connected rigidly to a part of the vehicle, preferably to the backrest 2 of the vehicle seat. A connecting element 15 is fixedly connected to the armrest 1 at at least two points. In particular, the connecting element 15 is connected rotationally conjointly to the armrest 1, that is to say the connecting element 15 is jointly pivoted during the pivoting of the armrest 1. Furthermore, provision is made for the connecting element 15 to have a stop element 19 which prevents a pivoting movement of the armrest 1 beyond the usage position.

Here, provision is made whereby, when the usage position is assumed, the stop element 19, with the bracket means 10, interacts, in positively locking fashion along a direction running perpendicular to the primary axis 11, with an abutment 21 of the bracket means 10, and thus ends a pivoting movement of the armrest during the transfer from the stowage position into the usage position. In particular, provision is made whereby the connecting element 15 ends a pivoting movement along a first direction of rotation by virtue of the stop element 19 interacting in positively locking fashion with the bracket means 10, in particular with the abutment 21 thereof, in positively locking fashion along a direction running parallel to the first direction of rotation, wherein the armrest 1 can be transferred from the stowage position into the usage position by way of a pivoting movement along the first direction of rotation. Furthermore, the locking aid is arranged on the connecting element 10. The locking aid 18 is configured such that the force required for the pivoting movement initially increases, preferably in continuous fashion, along the first direction of rotation from the stowage position to the usage position, and then decreases again, preferably immediately, when the usage position is assumed. The passenger 100 thereby advantageously identifies whether or not the usage position/stowage position has been assumed by the armrest 1. The locking aid 18 thus makes it easier for the passenger 100 to transfer the armrest from the stowage position into the usage position. Furthermore, the locking aid 18 may be configured such that the locking aid 18 prevents the armrest 1 from departing from the usage position by way of a pivoting movement of the armrest along a second direction of rotation in the event of low forces acting on the armrest 1, for example as a result of light vibration or rattling, wherein the pivoting movement of the armrest along the second direction of rotation is provided for the transfer of the armrest 1 from the usage position into the stowage position. If the pivotable armrest 1 is integrated in a vehicle, then the light vibration or rattling may be caused for example by a ground undulation or the like.

FIG. 3 illustrates a bracket means 10 for a system having a pivotable armrest 1 and having a locking aid 18 as per the first exemplary embodiment of the present invention, wherein the system is illustrated in an exploded illustration on the left-hand side and in joined-together form in two perspective views (front view and rear view) on the right-hand side. Here, provision is made for the bracket means 10 to have a main body which can be fastened by way of fastening devices 9 to a part of the vehicle body or of the interior equipment, for example to the backrest 2 of the vehicle seat. For example, the fastening device 9 is a hole by way of which the bracket means 10 can be fixedly screwed to the vehicle body. Provision is furthermore made for the main body of the bracket means 10 to have a circular cutout 17 in which there is mounted a pivot spindle 28 which is rotatable or pivotable about the primary axis. Provision is preferably made for the connecting element 15 and the pivotable armrest 1 to be spatially separated by the main body and to be connected rotationally conjointly to one another by way of the pivot spindle 28 that is mounted rotatably in the circular cutout. A joining means, for example a screw 14, is provided for the connection of the pivotable armrest 1 and/or of the connecting element 15 to the pivot spindle 28. Furthermore, provision is made for the locking aid 18 to be arranged on the connecting element 15, in particular between the stop element 19 and bracket means 10. Furthermore, the bracket means 10 has a guide cap 12 which at least partially covers the bracket means 10. Here, the guide cap 12 preferably likewise has a circular cutout 17, through which the pivot spindle 28 leads. Furthermore, the locking aid has a spring element 25 and a displaceable part, wherein the displaceable part is in this case in the form of a hollow body 16. The hollow body 16 partially encases the connecting element and partially accommodates the spring element. That part of the hollow body 16 which accommodates the spring element 25 is arranged on that side of the connecting element 15 which faces toward the armrest 1. Furthermore, the spring element 25 is configured such that it lies on the stop element 19. Here, provision is made for the spring element to be configured such that the stop element 19 can rotate relative to the spring element 25 without the contact between the stop element 19 and a first end of the spring element 25 being eliminated. In this way, it can be ensured that the first end of the spring element is or remains positionally fixed relative to the connecting element 15 regardless of the degree of pivoting of the armrest. In particular, the spring element 25 has, at the first end 25, an abutment surface with a curvature, wherein the curvature is adapted to the shape of the stop element 19. By way of the curvature, the likelihood of slipping of the first end of the spring element 25 can advantageously be reduced. The displaceable part of the locking aid is arranged on the second end of the spring element.

FIG. 4 illustrates, in three different states of assembly, the locking aid 18 for the system having the pivotable armrest 1 and having the locking aid 18 as per the first exemplary embodiment of the present invention. The connecting element 15, the displaceable part 16 and the spring element 25 are illustrated individually in the upper image of FIG. 4. The displaceable part and the spring element 25 have been joined together to form the locking aid 18 in the middle image of FIG. 4. Here, provision is made for the displaceable part 16 to be fixedly connected to the second end of the spring element 25. The second end of the spring element 25 is preferably clipped to the displaceable part. In the lower image of FIG. 4, the locking aid 18 is arranged displaceably on the connecting element 15. In particular, provision is made for the displaceable part 16 to have a hollow body, the cavity of which can receive the connecting element 15, and the inner wall of which serves at least partially for the guidance of the locking aid 18 along an offset direction 32.

FIG. 5 illustrates, in a side view, the bracket means 10 for the system having the pivotable armrest 1 and having the locking aid 18 as per the first exemplary embodiment of the present invention, wherein the armrest 1 is, from left to right, situated in the stowage position, in a transition position and in the usage position. Provision is made for the locking aid 18 to be in frictionally engaging contact with the bracket means 10 at a contact point or along a contact surface. The displaceable part 16 of the locking aid 18 preferably has a projection, wherein the projection is in frictionally engaging contact with the bracket means 10. In particular, provision is made for the spring element 25 to be configured and arranged such that the spring element 25 presses the displaceable part of the locking aid 18 against the bracket means 10 and thereby realizes the frictionally engaging contact between the locking aid 18 and bracket means 10, wherein the intensity of the frictionally engaging contact is defined by way of a repelling force of the spring element 25. Here, provision is also made for the bracket means 10 to be shaped such that the spacing between the first end of the spring element 25 and the contact point or the contact surface changes during a pivoting movement of the armrest 1. With the reduction of said spacing, the intensity of the frictionally engaging contact can be increased by way of the repelling force of the spring element, and by way of an increase of said spacing, the intensity of the frictionally engaging contact can be reduced. Here, it is conceivable for the bracket element to have

- a protuberance for reducing the spacing between the first end of the spring element and the contact point (or the contact surface) during a pivoting movement of the armrest and/or
- an indentation for increasing the spacing between the first end of the spring element and the contact point (or the contact surface) during a pivoting movement of the armrest.

In particular, provision is made for the spacing between the first end of the spring element 25 and the contact point (or the contact surface) to be smaller in the transition position than in the usage or stowage position. In this way, the frictionally engaging contact is of lower intensity in the usage position or in the stowage position than in the transition position. Provision is also made for the displaceable part to be displaced along the offset direction 32 during the transfer of the armrest 1 from the usage position into the stowage position. In particular, provision is made for the bracket means 10 to be shaped such that the adjustable part 16, in particular the projection, must be moved along a ramp in order to depart from the usage position or from the consumption position. In order that the adjustable part can overcome the ramp, increased expenditure of force is required during the pivoting of the armrest and thus during the pivoting of the connecting element 15. In this way, it is made difficult for low forces acting on the armrest 1 to pivot the armrest 1 out of the stowage position or out of the usage position. In this way, the locking aid 18 can contribute in a positive manner to the fixing of the armrest 1 in the usage position or stowage position.

While specific embodiments of the invention have been shown and described in detail to illustrate the application of the principles of the invention, it will be understood that the invention may be embodied otherwise without departing from such principles.

The invention claimed is:

1. A system comprising:
    a bracket device comprising a connecting element;
    a pivotable armrest; and
    a locking aid, wherein the armrest is articulated on the bracket device so as to be pivotable about a primary axis and can be transferred reversibly between a usage position and a stowage position via a transition position, wherein the armrest is connected rotationally conjointly to the connecting element, wherein the locking aid is arranged on the connecting element, wherein the locking aid is in frictionally engaging contact with the bracket device at a contact point or along a contact surface, wherein the locking aid is configured such that the frictionally engaging contact between the bracket device and the locking aid in a transition position is greater than that in the usage position or in the stowage position or both in the usage position and in the stowage position, the locking aid comprising a displaceable part, the displaceable part being displaceable relative to the connecting element along an offset direction, wherein a spring element is, at a first end, arranged substantially positionally fixedly relative to the connecting element, wherein the spring element is connected at a second end to the displaceable part, wherein the bracket element is configured such that the spacing between the first end of the spring element and the contact point or the contact surface is smaller in the transition position than in the usage position or stowage position.

2. The system as claimed in claim 1, wherein the bracket device comprises a guide cap, wherein the guide cap defines the spacing between the first end of the spring element and the contact point or the contact surface for the usage position, the transition position and a consumption position.

3. The system as claimed in claim 1, wherein the locking aid comprises the spring element with a restoring force.

4. The system as claimed in claim 1, wherein the displaceable part of the locking aid has a hollow body, wherein the hollow body at least partially encases the connecting element and the spring element.

5. The system as claimed in claim 1, wherein the displaceable part of the locking aid has a projection, wherein the projection is configured such that the projection is in frictionally engaging contact with the bracket device.

6. The system as claimed in claim 1, wherein the locking aid is configured such that the spring element presses the displaceable part of the locking aid against the bracket device.

7. A vehicle seat comprising:
    a bracket device comprising a connecting element;
    a pivotable armrest; and
    a locking aid, wherein the armrest is articulated on the bracket device so as to be pivotable about a primary axis and can be transferred reversibly between a usage position and a stowage position via a transition position, wherein the armrest is connected rotationally conjointly to the connecting element, wherein the locking aid is arranged on the connecting element, wherein the locking aid is in frictionally engaging contact with the bracket device at a contact point or along a contact surface, wherein the locking aid is configured such that the frictionally engaging contact between the bracket device and the locking aid in a transition position is greater than that in the usage position or in the stowage position or both in the usage position and in the stowage position, the locking aid comprising a displaceable part, the displaceable part being displaceable relative to the connecting element along an offset direction, wherein a spring element is, at a first end, arranged substantially positionally fixedly relative to the connecting element, wherein the spring element is connected at a second end to the displaceable part, wherein the bracket element is configured such that the spacing between the first end of the spring element and the contact point or the contact surface is smaller in the transition position than in the usage position or stowage position.

8. A vehicle seat as claimed in claim 7, wherein the displaceable part of the locking aid has a hollow body, wherein the hollow body at least partially encases the connecting element and the spring element.

9. A vehicle seat as claimed in claim 7, wherein the displaceable part of the locking aid has a projection, wherein the projection is configured such that the projection is in frictionally engaging contact with the device.

10. A vehicle seat as claimed in claim 7, wherein the locking aid is configured such that the spring element presses the displaceable part of the locking aid against the bracket device.

11. A vehicle seat as claimed in claim 7, wherein the bracket device comprises a guide cap, wherein the guide cap defines the spacing between the first end of the spring element and the contact point or the contact surface for the usage position, the transition position and a consumption position.

12. A vehicle seat as claimed in claim 7, wherein the locking aid comprises the spring element with a restoring force.

13. A system comprising:
a bracket device comprising a connecting element;
a pivotable armrest; and
a locking aid, wherein the armrest is articulated on the bracket device so as to be pivotable about a primary axis and can be transferred reversibly between a usage position and a stowage position via a transition position, wherein the armrest is connected rotationally conjointly to the connecting element, wherein the locking aid is arranged on the connecting element, wherein the locking aid is in frictionally engaging contact with the bracket device at a contact point or along a contact surface, wherein the locking aid is configured such that the frictionally engaging contact between the bracket device and the locking aid in a transition position is greater than that in the usage position or in the stowage position or both in the usage position and in the stowage position, the locking aid comprising a displaceable part, the displaceable part being displaceable relative to the connecting element along an offset direction, the locking aid being configured such that the spring element presses the displaceable part of the locking aid against the bracket device.

* * * * *